(12) United States Patent
Gaffney et al.

(10) Patent No.: US 9,081,580 B2
(45) Date of Patent: Jul. 14, 2015

(54) REAL-TIME MENU ARCHITECTURE

(75) Inventors: Eamon Gaffney, San Francisco, CA (US); Rene Garcia-Oineza, Las Cruces, NM (US)

(73) Assignee: Oracle International Corporation, Redwood Shores, CA (US)

( * ) Notice: Subject to any disclaimer, the term of this patent is extended or adjusted under 35 U.S.C. 154(b) by 1083 days.

(21) Appl. No.: 13/077,673

(22) Filed: Mar. 31, 2011

(65) Prior Publication Data

US 2012/0254801 A1    Oct. 4, 2012

(51) Int. Cl.
*G06F 3/048*    (2013.01)
*G06F 9/44*    (2006.01)
*G06F 3/0482*    (2013.01)

(52) U.S. Cl.
CPC ............... *G06F 8/38* (2013.01); *G06F 3/0482* (2013.01)

(58) Field of Classification Search
CPC .................................. G06F 8/38; G06F 3/0482
USPC .......................... 715/825, 810, 841, 843, 818
See application file for complete search history.

(56) References Cited

U.S. PATENT DOCUMENTS

| | | | |
|---|---|---|---|
| 6,256,028 B1 * | 7/2001 | Sanford et al. | 715/841 |
| 7,062,453 B1 * | 6/2006 | Clarke | 705/26.3 |
| 7,661,070 B1 * | 2/2010 | Munter et al. | 715/781 |
| 8,010,810 B1 * | 8/2011 | Fitzgerald et al. | 713/193 |
| 8,352,880 B2 * | 1/2013 | Moehrle | 715/811 |
| 8,560,965 B2 * | 10/2013 | Kawashima | 715/820 |
| 2006/0218507 A1 * | 9/2006 | K et al. | 715/810 |
| 2007/0033172 A1 * | 2/2007 | Williams et al. | 707/3 |
| 2007/0245264 A1 * | 10/2007 | Hoerentrup et al. | 715/835 |
| 2008/0270948 A1 * | 10/2008 | Lazzaro et al. | 715/854 |
| 2009/0167553 A1 * | 7/2009 | Hong et al. | 340/825.29 |
| 2010/0293546 A1 * | 11/2010 | Liu et al. | 718/100 |
| 2011/0060995 A1 * | 3/2011 | Whalen et al. | 715/736 |

OTHER PUBLICATIONS

Stu Nicholls Professional Dropdown #2, obtained at http://www.stunicholls.com/menu/pro_dropdown_2.html; Nov. 19, 2007, 2 pages.

* cited by examiner

*Primary Examiner* — Rashawn Tillery
(74) *Attorney, Agent, or Firm* — Trellis IP Law Group, PC

(57) ABSTRACT

A system and method for implementing a dynamic menu characterized by a real-time menu architecture. An example method includes determining a menu structure, with reference to a data set, for use with user interface software. A menu is then displayed, wherein the menu includes menu items arranged according to the menu structure. An initial drop-down menu list of the menu includes one or more of the menu items. Each menu item is associated with a data object of the data set. A signal is generated when a change is made to a data set corresponding to a menu item. The menu is then updated based on the signal. In an illustrative embodiment, the example method further includes employing a browser to trigger implementation of the method. The browser communicates with a web server, which communicates with an application that is adapted to analyze the data set and associated data structure and provide an update in response thereto via, the signal, to the web server. The web server includes software for enabling the browser to render an updated menu or graphical representation thereof.

30 Claims, 9 Drawing Sheets

REAL-TIME MENU ARCHITECTURE

BACKGROUND

The present application relates to software and more specifically to user interfaces and accompanying menu systems for facilitating navigating or accessing data or software functionality.

Menu systems are employed in various demanding applications, including web blogs, search engines, merchant websites, and business enterprise applications, such as Human Resources (HR), Customer Relationship Management (CRM), Project Management (PM), and Supply Chain Management (SCM) applications. Such applications often demand efficient menu systems that enable rapid and intuitive access to desired information and functionality.

Conventionally, software application menus remain relatively fixed, despite whether underlying data changes. To access underlying data, a user must often employ an application's menu to navigate to a particular user interface display screen or dialog box. The dialog box may provide a search field for searching for desired data. Underlying data, often called transactional data, may be returned as search results. When a user wishes to perform a particular operation on the retrieved data or to access related data, the user navigates the menu again to search for the related data or to access a user interface control corresponding to the desired operation. Selection of the user interface control may trigger display of a transactional page with additional user interface controls for modifying or approving a transaction or aspect of the data.

This process of repeatedly navigating a menu to locate data and then navigating the menu to perform an operation on the data, may be particularly inefficient and time consuming, especially if the user has not been trained to use the software.

In an example scenario, a user browsing a merchant website may wish to purchase a camera. The user employs the website's menu system to locate cameras. Once the user locates cameras for sale, the user may be required to search for a particular camera. When a webpage corresponding to a particular camera is found. A user may need to navigate to another page to purchase the camera. If the user wishes to purchase batteries for the camera, the user may be required to navigate the menu system again or otherwise enter data in a search field. To purchase a lens for the camera may require further navigation and/or searches. Requisite menu navigation, searching, and so on, may be counterintuitive to users and may lead to reduced sales and reduced customer satisfaction with the website.

SUMMARY

An example method for implementing a dynamic menu that updates in response to changes in underlying data includes determining a menu structure, with reference to a data set, for use with user interface software; displaying a menu, which includes menu items arranged according to the menu structure; providing an initial drop-down menu list, which includes one or more of the menu items, wherein each menu item associated with a data object of the data set; generating a signal when a change is made to a data set corresponding to a menu item; and updating the menu based on the change in response to the signal.

In an illustrative embodiment, the example method further includes employing a browser as the user interface software. The browser displays a user interface control, such as a menu option, for triggering the method. The browser communicates with a web server, which communicates with an application that is adapted to analyze the data set and associated data structure and provide an update in response thereto via, the signal, to the web server. The web server includes software for enabling a browser to render an updated menu or graphical representation thereof.

The menu structure is characterized by a hierarchical tree structure. Selection of a menu item corresponding to a leaf of the tree structure activates a transactional page corresponding to the leaf. The menu provides a user option to trigger an action associated with a first menu item. The user option is implemented via a second menu item that is displayed in the menu in proximity to the first menu item. In the illustrative embodiment, the action triggered by user selection of the second menu item includes navigation to a third menu item that is related to the first menu item based on a predetermined criterion. The predetermined criterion may include the existence of a key code that is common to data objects corresponding to the first menu item and the third menu item.

Another menu user option facilitates displaying the menu in a graphical format, such as a graphical depiction of the hierarchical tree structure or portion thereof. A drop-down menu or link is displayed in association with a leaf of the graphical depiction of the hierarchical tree structure. The drop-down menu or link provides one or more user interface controls for performing an action associated with data represented by the leaf. The drop-down menu displayed in association with a leaf of the displayed hierarchical tree structure may be further represented as a menu item of the menu.

One or more fly-out menu lists may be displayed upon user selection of a menu item that is associated with one or more subordinate menu items. An indication of a position in the menu corresponding to where a user has navigated to in the menu may be displayed via a breadcrumb band that is positioned above one or more displayed menu lists or menu fly-out lists, as discussed more fully below. The breadcrumb band may be adapted to selectively scroll to accommodate tracking of a user position in a menu. Elements of the breadcrumb band are called breadcrumbs and represent selectable menu items. Menu items displayed in a given menu are selectively presented to a user in one or more lists or drop down menus based on one or more data permissions associated with the user of the menu.

Hence, certain embodiments disclosed herein allow users to not only navigate folders in the menu but to also allow them to navigate real-time data, i.e., such that when data referenced by a menu changes, the menu adapts to reflect the change. This underlying data can be populated differently for different users and can dynamically change depending on any number of criteria. For example, as underlying data is updated, so does the data that the user can navigate via the menu. The user can seamlessly cross the divide from navigation to data processing, intuitively reaching the desired underlying data in one navigation sequence, rather than repeatedly navigating a menu and then entering search queries to reach desired data. The accompanying menu architecture allows real-time data to be displayed in a menu seamlessly and in such a way that the end user may not even be aware they are navigating real time data. In addition, the menu may allow for the association of related actions at any level or all levels in the menu.

Such menu capabilities, may facilitate improving efficient access to data by eliminating unnecessary re-navigation of a menu to access to current data and by providing efficient mechanisms, e.g., breadcrumbs to enable a user to track their position in a menu. Menu options to perform actions on the underlying data further assist the user and may, in some cases, eliminate the need to access a particular transactional page associated with the data. By enabling direct navigation to live underlying data, often called transactional data, via an intuitive menu structure that tracks a users location in a menu striker, businesses may more efficiently access underlying data to facilitate informed decision making, and customers of merchant websites may more readily access information and order pages for products and services they seek.

A further understanding of the nature and the advantages of particular embodiments disclosed herein may be realized by reference of the remaining portions of the specification and the attached drawings.

DETAILED DESCRIPTION OF EMBODIMENTS

Although the description has been described with respect to particular embodiments thereof, these particular embodiments are merely illustrative, and not restrictive.

While the present application is discussed with respect to menu implementations in a web browser, embodiments are not limited thereto. For example, dynamically updating menus that change to reflect changes in underlying data and/or functionality or actions associated with menu items may be employed in virtually any user interface software application, where access to data and or functionality is needed.

Furthermore, while embodiments discussed herein are particularly adapted to reflect changes in underlying data content, embodiments are not limited thereto. For example, menu structures (not just menu items) may be automatically updated to reflect changes in associations of underlying data.

In addition, while certain menus discussed herein are characterized by a different structure or architecture than a structure or architecture of the underlying data, embodiments are not limited thereto. For example, in certain implementations, the menu structure may parallel a hierarchical structure used to organize underlying data.

For clarity, certain well-known components, such as hard drives, processors, operating systems, power supplies, and so on, have been omitted from the figures. However, those skilled in the art with access to the present teachings will know which components to implement and how to implement them to meet the needs of a given application.

Figure 1:
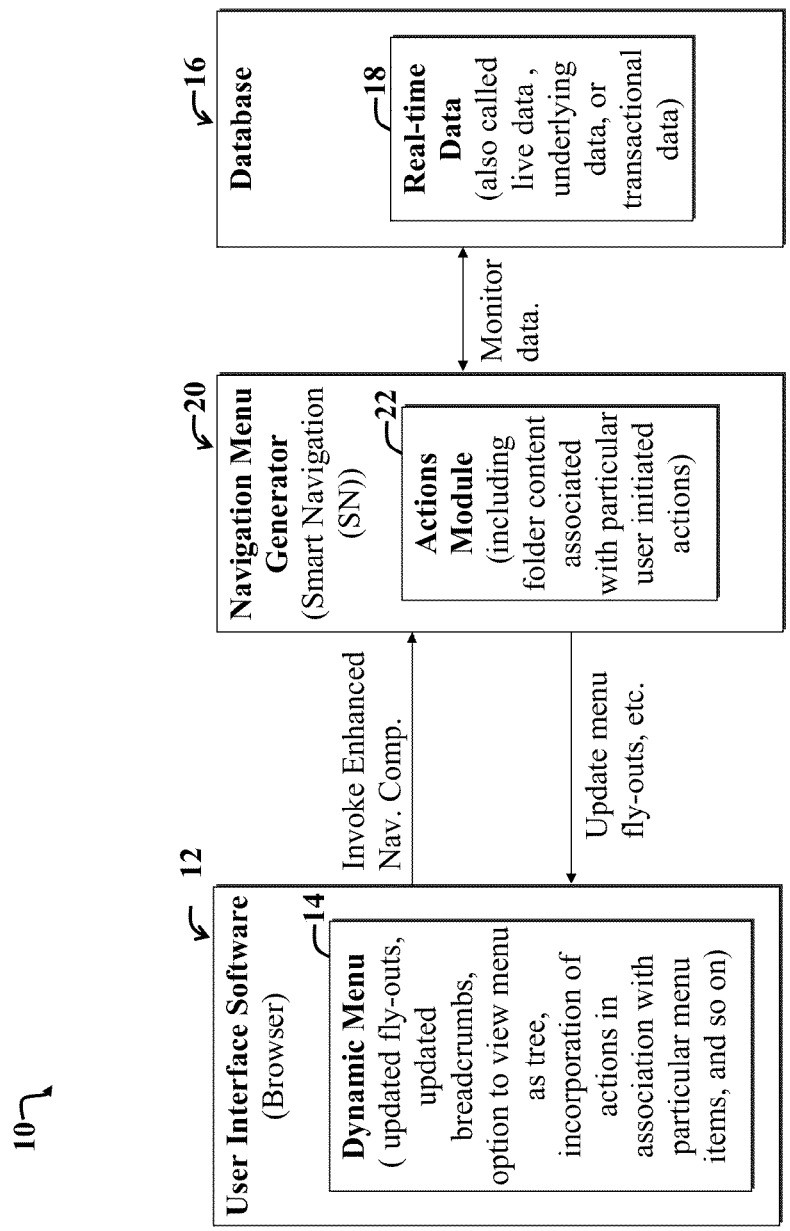
FIG. 1 is diagram illustrating a first example embodiment of a system for facilitating implementing a dynamic menu that automatically updates to reflect changes in underlying data.

FIG. 1 is diagram illustrating a first example embodiment of a system 10 for facilitating implementing a dynamic menu (s) 14 that may automatically update to reflect changes in underlying data 18. For the purposes of the present discussion, a dynamic menu may be any menu of a software application that changes, either automatically or in response to user interaction with the menu, in response to changes in data, functionality, and/or data structures referenced by the menu.

The example system 10 includes a navigation generator 20 in communication with a browser 12 and a database 16. The browser 12 acts as user interface software for displaying a dynamic menu 14. The dynamic menu 14 is said to be dynamic since the menu is updated in to reflect changes in underlying data 18 maintained by the database 18 in response to user interaction with the dynamic menu 14, such as in response to user selection of a folder or menu item thereof. The underlying data 18 is said to underlie a menu structure of the menu 14, since the menu 14 is employed to navigate the data.

The underlying data 18 may be implemented as a data set that includes various data objects or data elements, also called data points. For the purposes of the present discussion, a data object may be any grouping of data. Examples of data objects include records or tables of a database. A database may be any collection of data. Note that the underlying data 18 may be structured according to a database hierarchy or may be relatively unstructured, e.g., arranged in a grid format. Each data object of the data set represented by the underlying data 18 may be associated with a key code. Each key code may be adjusted to reflect relationships between different data objects. For example, a data object associated with corporate headquarters may include a key code with a set of characters that is shared by a key code of a data object corresponding to a corporate president. The key codes may be employed to determine a menu structure for implementing the menu 14.

The menu structure of the menu 14 may represent a superstructure, i.e., a hierarchical organization of data that may differ from any hierarchical organization of the data 18 of the database 16. The underlying data 18 is called real-time data or live data, since the data 18 may be changed in real time. When the data changes, the navigation generator 20 may detect the change and facilitate updating the dynamic menu 14 in response to user interaction with the dynamic menu 14. Note that changes to the underlying menu data source 18 can be performed either batch or real time without departing from the scope of the present teachings. In real time mode, menu navigation changes are reflected to end users immediately. However, in batch mode, changes are reflected at a pre-determined time. For example, batch mode can be used for organization changes when the changes should not be visible until a company wide announcement has been made.

In operation, a user employs the user interface of the browser 12 to trigger or invoke the navigation generator 20. The navigation generator 20 includes one or more software routines for determining the structure of the menu 14 and related actions 22 associated with particular data objects of the real time data 18 and for detecting changes to the underlying data 18 and updating the menu structure, related actions, and data objects referenced by the menu 14.

The structure of the menu 14 may be a hierarchical structure, such as a tree. For the purposes of the present discussion, a hierarchical tree structure may be any hierarchy, where a node of the tree structure may have a link or association to a superior node and zero or more links to a subordinate node. A hierarchy may be any arrangement of items, e.g., data objects, names, values, categories, and so on. The items may be ordered or positioned such that they exhibit superior or subordinate relationships with related items in a data set. A hierarchy may refer to a displayed representation of data items or may refer to data and accompanying relationships existing irrespective of the representation.

When the user activates a drop-down menu list via the menu 14 and selects a menu item of the menu list, a fly-out menu list (also simply called fly-out) is displayed if the selected menu item is associated with child, i.e., subordinate menu items. To display a fly-out menu list, the navigation generator 20 references any data associated with a menu item (also called menu element) used to trigger the fly-out with reference to the database 16. Code, such as HyperText Markup Language (HTML), to generate the fly-out reflects the current state of the real-time data 18 referenced by the menu generator 20. Such HTML code may be forwarded from the navigation generator 20 to the browser 12 to facilitate rendering the dynamic menu 14.

For the purposes of the present discussion, a menu item may be any element or component of a menu. Generally, menu items are selectable to enable access to functionality or to enable further navigation in a particular menu. A subordinate menu item may be any menu item that is accessible via another menu item in a menu provided by user interface software.

The navigation generator 20 also facilitates tracking a user's navigation location in the menu 14 via breadcrumbs and facilitates updating the menu 14 with menu items that represent user interface controls for accessing functionality to manipulate data associated with a particular menu item or to navigate to related data. For the purposes of the present discussion, a breadcrumb may be any mechanism for indicating a previously visited menu item. In the present specific embodiment, a particular breadcrumb may act as a menu item upon user selection thereof.

Note that the browser 12 may be implemented via a conventional web browser or other type of data navigation tool, which may render dynamic menus 14, based on input from the navigation generator 20.

Figure 2:
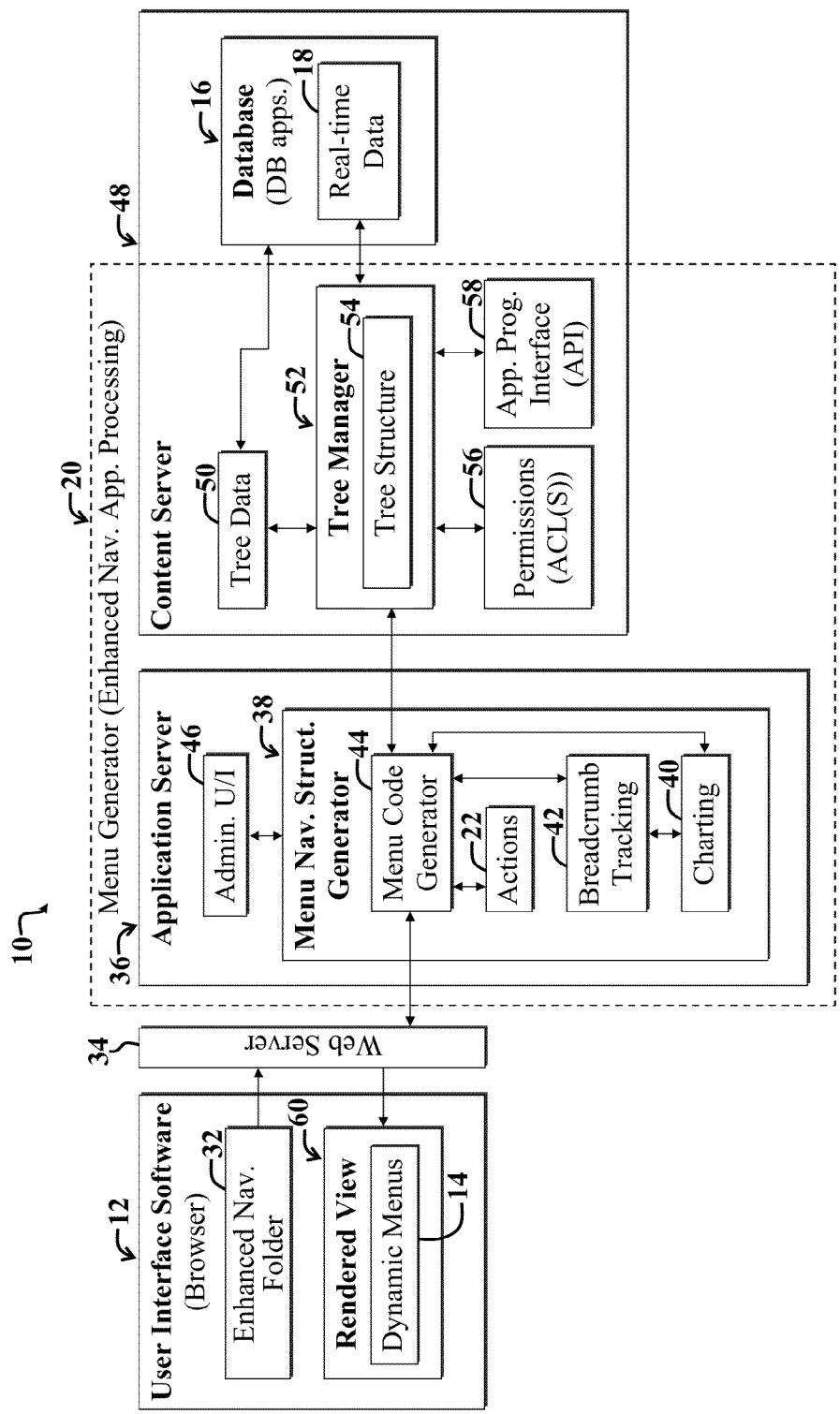
FIG. 2 illustrates a more detailed diagram of an implementation of the embodiment of FIG. 1.

FIG. 2 illustrates a more detailed diagram of an implementation of the system 10 of FIG. 1. The system 10 of FIG. 2 shows enhanced navigation functionality, i.e., the menu generator 20, as employing a web server 34 in communication with an application server 36, which communicates with a content server 48. Note that the various servers 34, 36, 48 may be implemented a single computer or web server application without departing from the scope of the present teachings. In general, various modules discussed herein may be implemented via modules distributed across a network or on a signal machine. Furthermore, while certain modules are shown as separate blocks from other modules, such modules may be combined with other modules without departing from the scope of the present teachings.

The web server 34 interfaces the browser 12 with the application server 36. The application server 36 runs a menu structure generator 36, which includes a charting module 40 in communication with a breadcrumb-tracking module 40 and a menu code generator 44. The menu code generator 44 communicates with the breadcrumb-tracking module 42 and an actions module 44. The actions module 44 maintains information pertaining to menu folders that contain predetermined actions, as discussed more fully below.

An administrator user interface 46, which may include software and hardware for manipulating the user interface 46, communicates with the application server 36 and menu structure generator 38. The administrator user interface 46 optionally communicates with an Application Programming Interface (API) of the content server 48.

The content server 48 includes a menu tree manager 52, which communicates with the menu structure generator 38 of the application server 36. The content server 48 further maintains tree data 50 derived from data 18 of the database 16. The database 16 also communicates with the tree manager 52, which maintains a representation of the current tree structure 54 to be used by menus 14 of the browser 12. For illustrative purposes, the tree manager is shown communicating with a permissions module 56, which may maintain one or more Access Control Lists (ACLs) for selectively modifying the tree structure 54 and associated content to be delivered to the application server 36 to facilitate rendering of the dynamic menus 14 via the browser 12. The tree structure and associated data rendered by the browser 12 is modified, with reference to the permissions module 56, to ensure that a user that has logged in to the functionality provided by the menu structure generator 36 has been granted permissions to view the data rendered in the dynamic menus 14.

A tree-manager API 58 may be employed to enable an administrator or other authorized personnel to selectively modify the general tree structure 54 and associated behaviors and to change user permissions maintained by the permissions module 56.

In operation, a user employs the browser 12 to select an enhanced navigation folder 32. Selection of the enhanced navigation folder 32 results in generation of a signal or message to the enhanced navigation generator 38 to invoke functionality of the menu structure generator 38 and to provide code for rendering the dynamic menus 14 and associated page view 60. The page view 60 may include the dynamic menus 14, representations of underlying transactional data via a transactional page or window in association with related actions that can be performed on the transactional data, representations of a graphical depiction of a tree hierarchy representative of the dynamic menus 14, and so on. Page: 11 For the purposes of the present discussion, a transactional page may be any user interface window, dialog box, or other mechanism for illustrating contents of a data object and providing one or more options to manipulate the contents thereof Transactional data may refer to any data that is grouped according to a predetermined category.

Upon invoking the functionality of the navigation structure generator 38, a user may be prompted to log onto the system, such as by entering authentication information, such as passwords, identification numbers, and so on. This user authentication information is then employed by the tree manager 52 to tailor the code used to generate subsequently displayed dynamic menu features to permissions associated with the user.

The dynamic menu 14 may provide a user option for displaying the menu 14 in a graphical format, such as a hierarchical tree, as discussed more fully below. If the user selects such an option, the charting module 40 of the menu structure generator 38 is invoked. The menu code generator 44 may access the tree manager 52 for the latest menu updates, and then activate the charting module 40 to produce code, e.g., HTML for rendering the tree structure. The code, which may include updated breadcrumb information, which may be retrieved from the breadcrumb tracking module 42, is provided to the menu code generator 44. The menu code generator 44 may augment the code with any actions folders or related action menu items indicated via the actions module 22. The resulting code for rendering the page view 60 is then forwarded to the browser 12. The browser 12 then renders the page 60, i.e., user interface display screen.

Related actions are called "related" actions, since functionality comprising the actions is related to or associated with a particular menu item that is displayed in the menus 14 or menu tree in proximity to a link, menu item, and/or other user interface control used to invoke the functionality or action. An action may be a computer process or operation on underlying data, or may be another function, such as a navigation function that enables navigating to a different related menu item. Relations between menu items may be predetermined via the API 58 and tree manager 52. Related data objects corresponding to related menu items may be marked by particular key codes in accordance with a particular marking or identification scheme. Exact details of the identification scheme used to associate different data objects or menu items to other menu items or data objects are implementation specific. Those skilled in the art with access to the present teachings may readily implement a scheme for establishing and/or marking relationships between data objects and between corresponding menu items.

Hence, the actions module 22 may maintain information identifying which actions are associated with which menu nodes, i.e., menu items. Actions associated with a particular menu item may be changed based on user permissions. User permission information may be obtained by the actions module 22 from the permissions module 56 via the menu code generator 44 and tree manager 52. Alternatively, the actions module 22 may communicate directly with the permission s module 56 and/or tree manager 52.

The breadcrumb tracking module 42 includes one or more routines tailored to track where in the structure of the menu 14 a user has navigated to by selection of items thereof. A so-called breadcrumb trail is maintained, which indicates the sequence of nodes or menu items traversed to arrive at a particular location in the menu 14. This breadcrumb trail may be illustrated in the user interface display screen 60 (called page view) via a breadcrumb band, as discussed more fully below.

Figure 3:
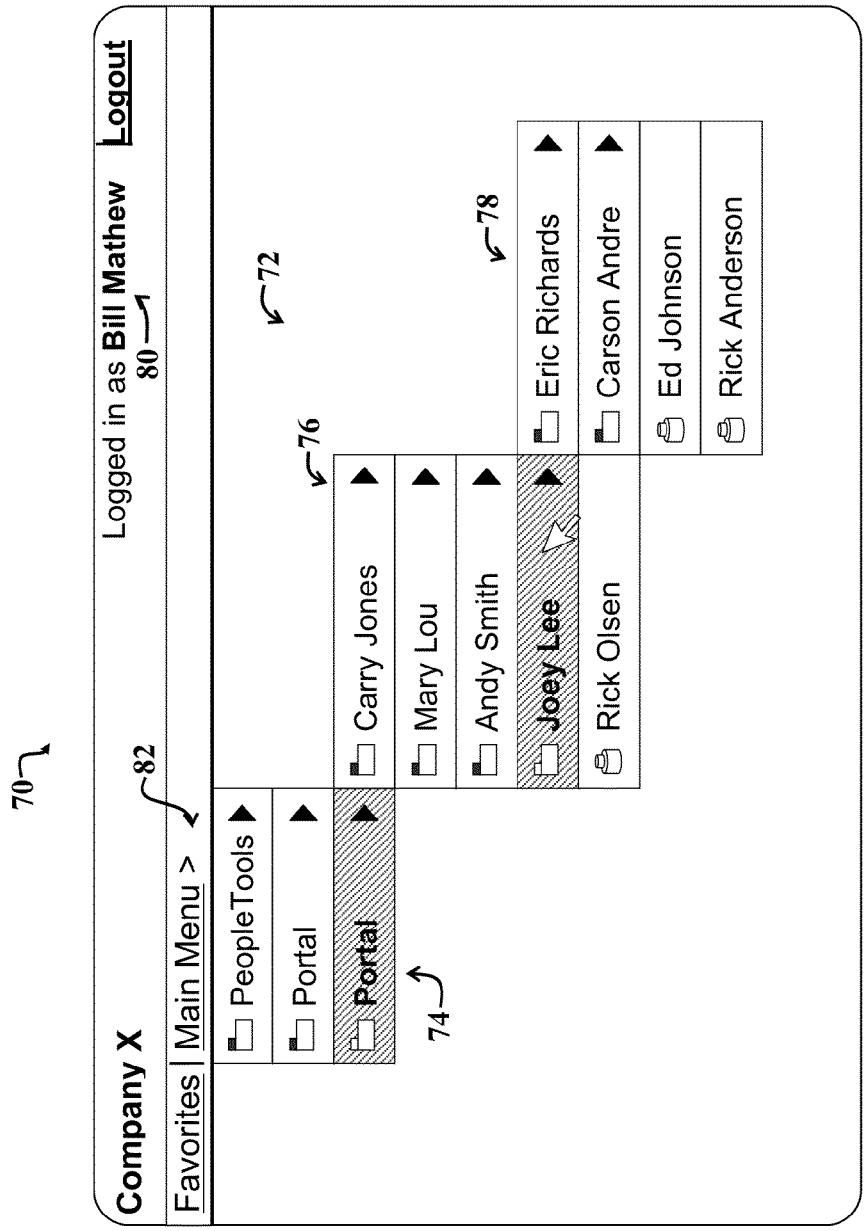
FIG. 3 illustrates a first example user interface display screen illustrating a first example dynamic menu.

FIG. 3 illustrates a first example user interface display screen 70 illustrating a first example dynamic menu 72. The menu 72 has been tailored according to data access permissions associated with the current user, e.g., Bill Mathew, as indicated via login information 80. The initial starting position of the menu 72 and menu items displayed in the menu are tailored according to user permissions and/or preferences.

Note that while certain embodiments are discussed as adjusting menu content based on user permissions and changes in underlying data, embodiments are not limited thereto. For example, one or more user interface features or controls may be provided to enable a user to initiate certain changes to a menu, without departing from the scope of the present teachings.

The menu 72 includes a breadcrumb band 82 indicating that a user is currently navigating a main menu of a favorites node of the menu 72. The user has selected a main menu item of the breadcrumb band 82, as indicated by a first drop-down list 74. The first example menu drop-down list 74 includes various menu items, including PeopleTools, Portal, and My Org menu items.

For the purposes of the present discussion, a breadcrumb band may be any region of a user interface display screen used to depict one or more visited menu locations. In the present specific embodiment, the breadcrumb band illustrates a sequence of visited menu locations, i.e., breadcrumbs. Each breadcrumb may correspond to a data object of a data set used to populate the menu.

The user has chosen to navigate the My Org menu item of the first drop-down list 74 by mouse-over, i.e., by positioning a computer mouse cursor over the My Org menu item. Note that a mouse-over option may be replaced with another option, such as a single click or double click option to activate fly-out menus associated with a given menu item. Exact choices of selection methods may be implementation specific and may be altered without departing from the scope of the present teachings.

Selection of the My Org menu item results in the display of an associated first fly-out menu list 76, which lists additional menu items. The additional menu items are called subordinate menu items of the My Org menu item, since they are further down in the menu hierarchy.

The first fly-out menu list 76 includes various menu items, such as Carry Jones, Many Lou, Andy Smith, Joey Lee, and Rick Olsen menu items. Such menu items correspond to data objects that contain data associated with the various persons named via the menu items. Note that the Rick Olsen menu item represents a leaf of the underlying menu tree structure, since no additional fly-out navigation options are provided in association therewith. Selecting or double-clicking the Rick Olsen menu item may result in display of a transactional page associated with Rick Olsen. Alternatively, a tree diagram is illustrated, with a leaf of the tree corresponding to Rick Olsen highlighted. The resulting displayed leaf may provide additional user interface controls for manipulating data associated with Rick Olsen or for navigating to a different location in the menu via a link provided in the leaf. If a different location is navigated to, the breadcrumb band 82 may be updated to reflect a navigation path that a user has taken to arrive at a new menu item.

In the present example user interface display screen 70, the user has selected the Joey Lee menu item, which triggers display of a second fly-out list 78. The second fly-out list includes various menu items, including an Eric Richards, Carson Andre, Ed Johnson, and Rick Anderson. The user may proceed in the fashion described above to continue navigating the menu 72.

To trigger display of a chart or other graphical representation, e.g., a tree diagram, of the menu 72, a user may, for example, double click a menu item, such as the Joey Lee menu item of the first fly-out menu list 76.

The user interface display screen 70 represents a simplified example of how an example menu may be displayed. Various additional menu features may be provided. For example, actions that can be performed in association with Joey Lee may be displayed via one or more folders and/or other menu items in the second fly-out menu list 78 associated with Joey Lee. More detailed implementations illustrating related actions associated with a particular menu item are discussed more fully below, e.g., with reference to FIG. 5.

Figure 4:
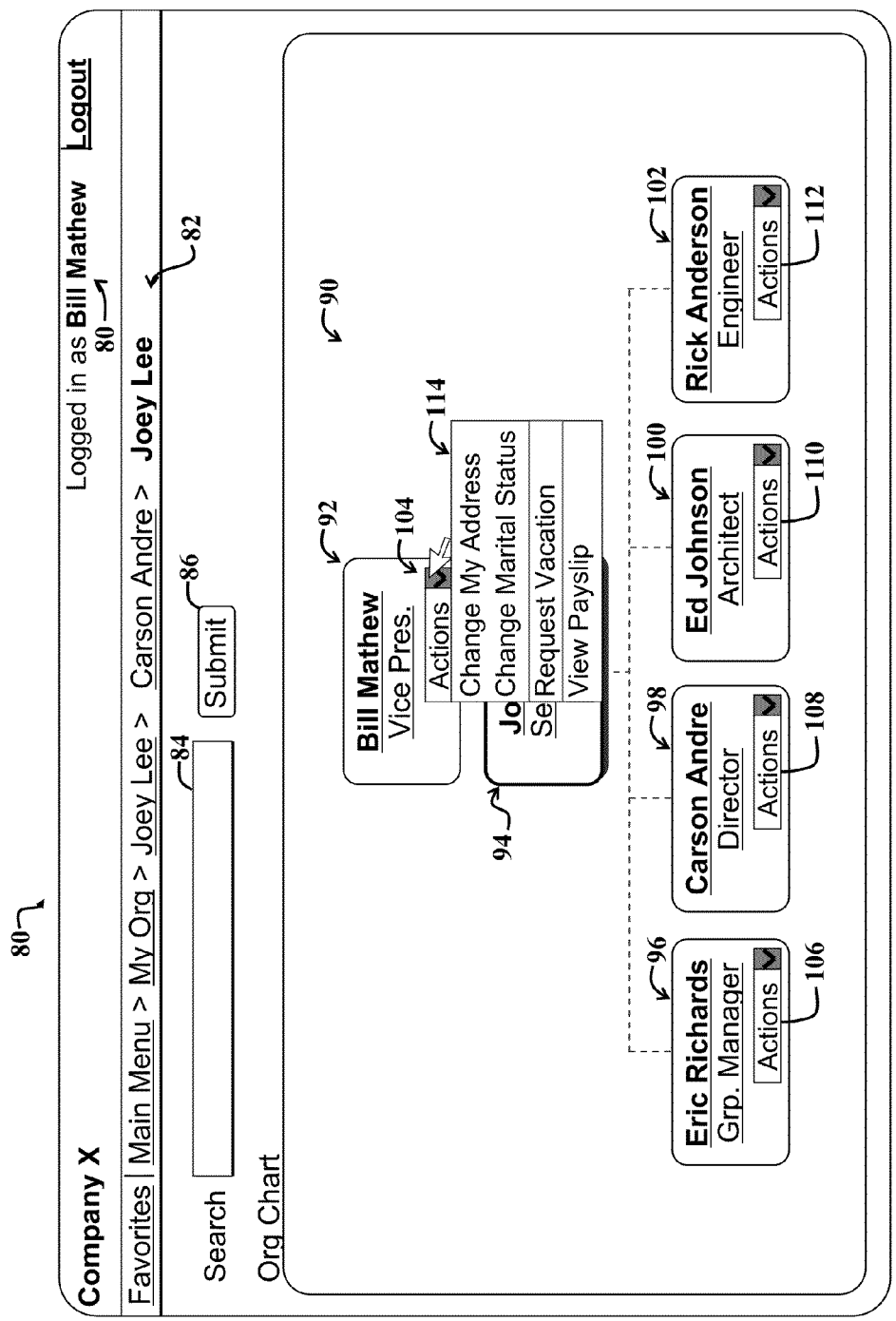
FIG. 4 illustrates a second example user interface display screen illustrating a graphical depiction of a hierarchical tree structure of the first example dynamic menu of FIG. 3.

FIG. 4 illustrates a second example user interface display screen 80 illustrating a graphical depiction of a hierarchical tree structure 90 of the first example dynamic menu 72 of FIG. 3. With reference to FIGS. 3 and 4, the tree structure 90, also called a tree graph, may be displayed after double-clicking the Joey Lee menu item of FIG. 3. Alternatively, another user interface mechanism or control may be provided to enable toggling between a display of a tree structure or menu fly-outs or simultaneous display of a tree structure and menu with accompanying fly-outs.

The tree structure 90 reflects the underlying structure of the menu 72 of FIG. 3. A Bill Mathew node 92 is the top node in the tree structure 90, as Bill Mathew is the user who logged into the accompanying menu-generation system, and the associated menu 72 of FIG. 3 started at an initial menu dropdown list 74 associated with Bill Mathew. A Joey Lee node 94 is shown highlighted, since the corresponding Joey Lee menu item was double-clicked to initiate display of the tree structure 90.

Nodes directly subordinate to the Joey Lee node 94 include an Eric Richards node 96, a Carson Andre node 98, a Ed Johnson node 100, and a Rick Anderson node 102. The nodes 92, 96-102 are shown including respective actions drop-down menus 104-112. Each of the actions drop-down menus 104-112 may provide user interface controls for triggering functionality or actions specific to a particular node or leaf of the menu tree structure 90. The specific functionality or actions associated with a given node or leaf may be predetermined, such as via an administrator with access to the API 56 of FIG. 2. The Joey Lee node 94 may also include a drop-down menu, which is obscured by a list 114 of the Bill Mathew drop-down menu 104.

Generally, actions or functionality provided in a drop-down menu associated with a particular node or leaf are determined to be related to the node or leaf or otherwise potentially useful to a user accessing the node or leaf. Exact mechanisms for determining whether an action or other functionality should be displayed in a particular drop-down menu is implementation specific. Such mechanisms may be implemented automatically according to predetermined rules or criteria or may be manually preestablished.

Each node or leaf of the menu tree structure 90 represents or is otherwise associated with a data object characterizing the underlying data 18 of FIG. 2 and further corresponds to a menu item of a menu. A menu may be accessed from the user interface screen 80 of FIG. 4 via an updated breadcrumb band 82. The breadcrumb band 82 illustrates that the user has currently navigated to the Joey Lee menu item 94. Display of a menu fly-out may corresponding to Joey Lee may be triggered by user selection of the corresponding breadcrumb element from the breadcrumb band 82.

For illustrative purposes, the menu band 82 is shown illustrating a navigation loop. In particular, the user has navigated from the Joey Lee menu item to the Carson Andre menu item and back to the Joey Lee menu item. For the purposes of the present discussion, a navigation loop may refer to any sequence of user selected items in a menu that results in returning to a previous position in a menu. For example, if a user traverses from menu item A to menu item B to menu item C and then traverses back to menu item A, then the user has traversed a menu loop.

User selection of the actions drop-down menu 104 activates a drop-down menu list 114, which provides various user options. Since Bill Mathew is the current user, actions drop-down list 114 may include options that may otherwise not be available to a user navigating to the Bill Mathew node 92. Example user options, i.e., user interface controls, for facilitating implementing actions or functionality, include user options to change address, change marital status, request a vacation, and to view a payslip. Other user options, such as to navigate to a related node, may also be provided in the drop-down list 114. A folder corresponding to the drop-down list 104 may be included in a menu accessible via the breadcrumb band 82. Such a folder is preferably displayed in a fly-out menu activatable via a Bill Mathew menu item corresponding to the Bin Mathew tree node 92.

Selection of a user option from the drop-down menu list 114 may trigger display of a transactional page, such as a dialog box or other window, whereby a user may, for example, change address information, marital status information, and so on. Similarly, selection of one of the subordinate nodes 96-102, also called sub-nodes, may trigger downward expansion of the tree structure 90 to reveal more subordinate nodes. The breadcrumb band 82 would then be updated to indicate that a user has navigated to, for example, the Carson Andre sub-node 98.

The example user interface display screen 80 further includes an optional search field 84 and submit button 86 for entering and initiating a query for menu items or nodes to be displayed. A user may continue navigating the menu or tree structure from any search results returned in response to the implementation of a query via the query field 84 and submit button 86.

Figure 5:
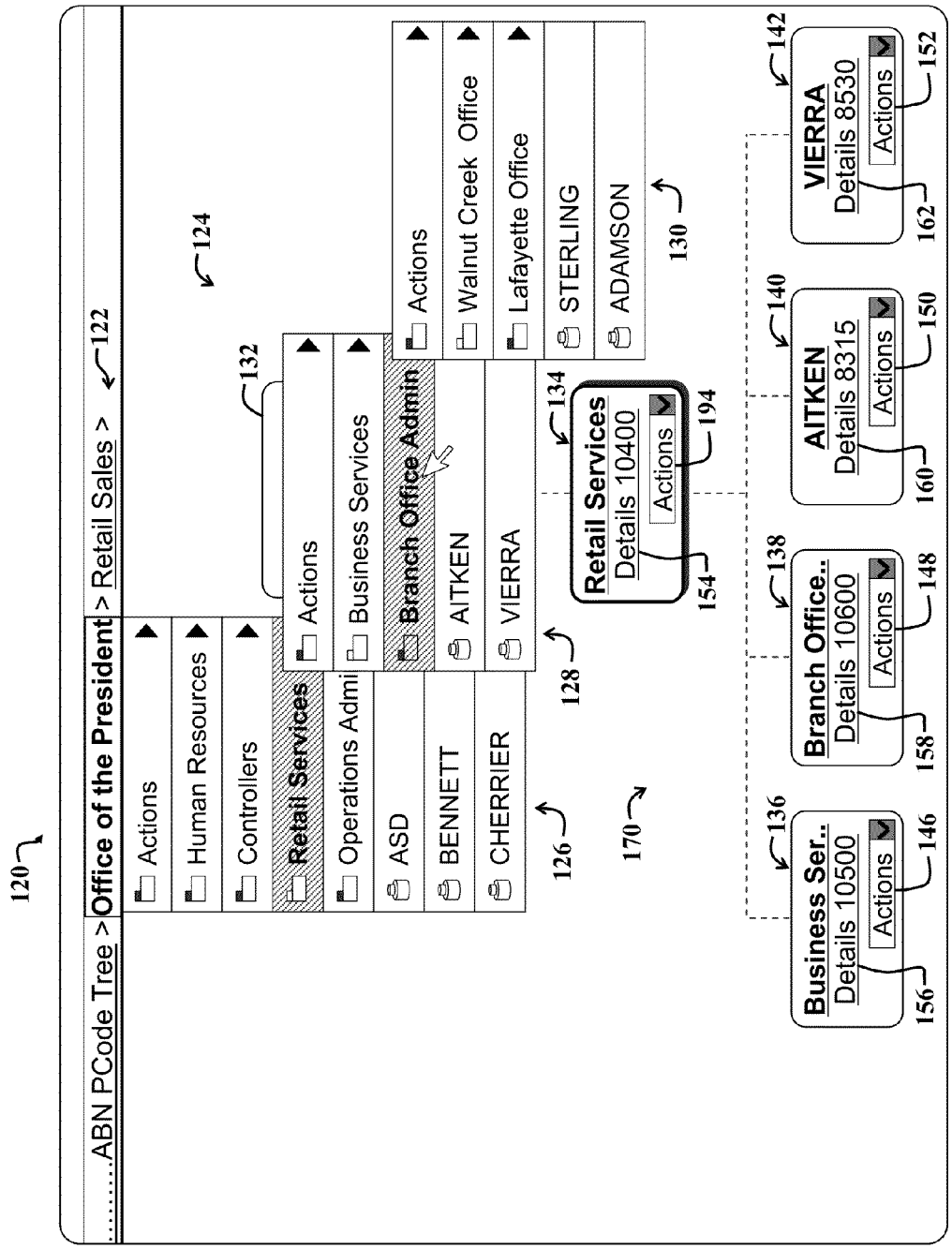
FIG. 5 illustrates a third example user interface display screen illustrating a second example dynamic menu simultaneously with a graphical depiction of a hierarchical tree structure characterizing the second example dynamic menu.

FIG. 5 illustrates a third example user interface display screen 120 illustrating a second example dynamic menu 124 simultaneously with a second graphical depiction of a hierarchical tree structure 170 characterizing the second example dynamic menu 124.

The present example user interface display screen 120 shows that a user ahs initially navigated to an Office of the President menu item, via a Main Menu and ABN PCode Tree menu items, as indicated in an updated breadcrumb band 122. The user has selected the Office of the President (OAP) breadcrumb (which is also considered a menu item), which has activated an OAP drop-down list 126. The drop-down list 126 includes various folder menu items, e.g., Actions, Human Resources, Controllers, Retail Services, and Operations Administrator folders, and further includes various leaf menu items, e.g., ASD, BENNETT, and CHERRIER leafs.

The user has employed the Retail Services folder of the OAP drop-down list 126 to activate display of a second menu tree 170, such as by double clicking on the Retail Services menu item. Hence, a corresponding Retail Services node 134 of the second menu tree 170 is shown in focus or highlighted. Furthermore, a Retail Services breadcrumb in the breadcrumb band 122 is shown as having been visited.

Selection of the Retail Services menu item of the OAP drop-down list 126 triggers display of a Retail Services (RS) fly-out menu list 128. Selection of a Branch Office Administrator folder of the RS fly-out menu list 128 triggers display of a corresponding Branch Office Administrator (BOA) fly-out menu list 130.

Each of the drop-down fly-out menu lists 126-130 shows an actions folder therein, where each action folder provides various user interface controls for performing actions and/or accessing functionality corresponding to the menu item used to activate the fly-out menu list. The actions folders and options provided therein may include similar content and options as corresponding drop-down lists. For example, an RS action drop-down menu control 144 may accommodate similar user options as the actions folder provided in the RS fly-out menu list 128.

Note that the menu tree 170, which may be implemented as a chart object, includes various nodes 132-142 corresponding to various menu items of the second dynamic menu 124. In general, each node 132-142 of the menu tree 170 includes an actions drop-down list control 144-152 that is analogous to a corresponding actions folder in a menu fly-out list.

In the present example embodiment, each node 132-142 of the menu tree 170 further includes a corresponding details link 154-162. Note that while menu items corresponding to such details links 154-162 are not shown in the dynamic menu 124, analogous links may be represented in the dynamic menu 124 without departing from the scope of the present teachings.

In an alternative operative scenario, where the dynamic menu 124 and menu tree 170 are adapted for use with a merchant website, a user searching for a camera may arrive at a camera node. From the camera node, a user may efficiently order batteries for the camera, purchase a lens, order, a manual, and so on, all without requiring complicated searching or re-navigation of a menu structure. In general, user interface controls for triggering actions, accessing different links, folders, functionality, and so on, that may be useful when a user has navigated to a particular tree node or menu item are provided at that tree node or menu item. If a user interface control associated with a particular action, navigation, or other functionality is deemed not useful based on predetermined criteria, then the user interface control may be removed from the dynamic menu 124 and corresponding menu tree 170. Exact details of the predetermined criteria are implementation specific and may be determined by those skilled in the art to meet the needs of a given implementation, without undue experimentation. In certain implementations, undesired or desired user interface controls may be directly removed or added to a dynamic menu or corresponding menu tree via the API 58 of FIG. 2.

Figure 6:
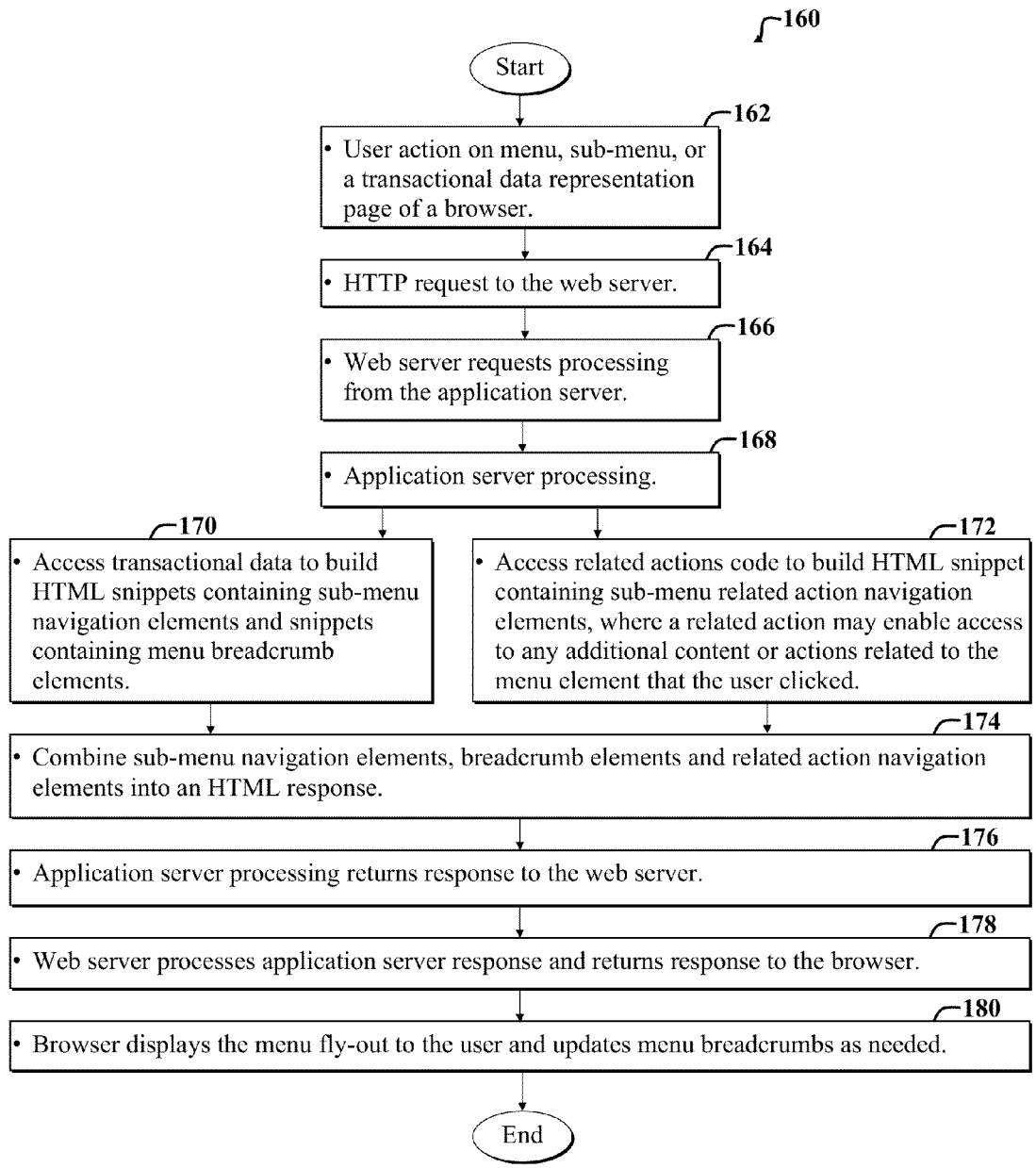
FIG. 6 illustrates a first flow diagram illustrating an example menu generation service process adapted for use with the embodiments of FIGS. 1-5.

FIG. 6 illustrates a first flow diagram illustrating an example menu generation service process 160 that is adapted for use with the embodiments of FIGS. 1-5. The process 160 includes a first step 162, which involves detecting a user action initiated via a browser user interface. The user action may involve selection of a user interface control, such as a menu item, button, or other user interface control. The user action may be triggered from a menu or user interface control in a transactional page, dialog box, or menu tree structure.

A second step 164 includes sending a HyperText Transport Protocol (HTTP) request message to a web server in accordance with the user action initiated via selection of a user interface control.

A third step 166 includes the web server requesting processing from an application server in response to detection of the HTTP request message from the browser.

In a fourth step 168, the application server begins the requested processing. Depending upon what processing is requested by the web server, a fifth step 170 and/or a sixth step 172 are subsequently performed.

If the requested processing pertains to generating a sub-menu, i.e., a menu fly-out, the fifth step 170 is performed. The fifth step 170 includes accessing transactional data, i.e., data underlying a menu. The fifth step 170 further includes building an HTML snipped containing menu breadcrumbs, i.e., menu breadcrumb elements.

Data is said to underlie a menu if the menu is used to navigate the data or to otherwise access the data. For the purposes of the present discussion, navigation may refer to a transition of a graphical user interface display from a first display of one or more objects to a second display of one or more objects in response to user selection of an object or control in the first display of one or more objects. A user is said to navigate data or to navigate a menu if the user selects one or more different displayed objects or items to activate other objects or items to be displayed. An object, such as a data object, may be any grouping of data and/or functionality. A representation of an object, i.e., a displayed object, may be displayed via graphical depiction, such as a menu item, dialog box, and so on. The graphical depiction of an object may also be called an object, a displayed object, or a node.

If the requested processing pertains to generating menu items and/or structures associated with or related to actions or content that is related to a particular selected menu item, then the sixth step 172 is performed. The sixth step 172 includes accessing one or more related actions and building an HTML snippet containing any sub-menu navigation elements representing related actions. A related action may be any action or user option to implement an action that is related to a menu item, also called menu element, which the user selected, such as by clicking, double-clicking, etc., depending upon the desired implementation. Note that a related action may include retrieving data or other content for display in a menu, tree structure, dialog box, or other user interface display mechanism.

After processing pertaining to the fifth step 170 and/or sixth step 172 is complete, a seventh step 174 is performed. The seventh step 174 includes combining any sub-menu navigation elements, such as fly-out menu items, breadcrumbs, and related action navigation elements into an HTML response message.

An eighth step 176 includes sending HTML response message, via an application running on the application server, to the web server.

A ninth step 178 includes processing the HTML response message, via the web server, and returning a resulting response message to the browser.

In a tenth step 180, the browser employs the response message from the web server to display a corresponding menu fly-out and to update menu breadcrumbs accordingly.

Note that the process 160 is merely illustrative and may be altered. For example, processing and messaging implemented via the web server and application server may be combined into a single server application running on one or more computers, without departing from the scope of the present teachings.

Figure 7:
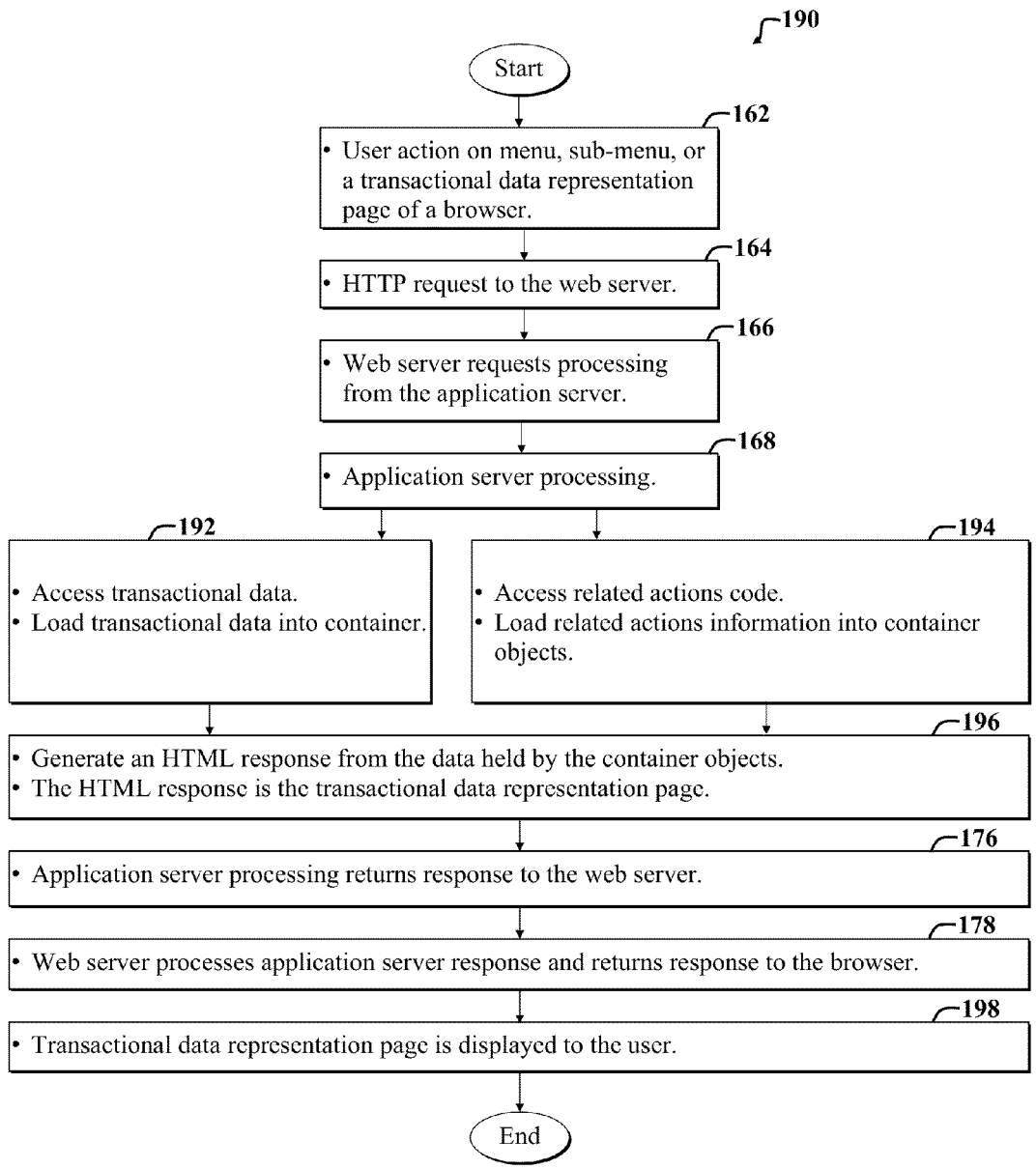
FIG. 7 illustrates a second flow diagram illustrating an example page generation service process adapted for use with the embodiments of FIGS. 1-5.

FIG. 7 illustrates a second flow diagram illustrating an example page generation service process 190 adapted for use with the embodiments of FIGS. 1-5.

The first four steps 162-168 of the related-content service process 190 are similar to the first four steps 162-168 of the menu generation service process of FIG. 7, however, different processing may occur in these steps depending upon the implementation.

After the fourth step 168, a transactional-data loading step 192 and/or a related-content loading step 194 is performed based on processing requested by the web server in the third step 166. If the web server requests that the application server perform processing pertaining to transactional data, then the transactional-data loading step 192 is performed. Similarly, if the web server requests that the application server perform processing pertaining to one or more related actions, then a related-actions loading step 194 is performed.

The transactional-data loading step 192 includes accessing transactional data, e.g., from a database or file system, and then loading the transactional data into a software-based container, such as an object.

The related-actions loading step 194 includes accessing information or code pertaining to one or more related actions, such as by retrieving the code or data from a database or file system, and then loading the code or data into container objects.

Subsequently, after data loading implemented in steps 192 and/or 194, an HTML-generation step 196 is performed. The HTML-generation step 196 includes generating an HTML response from the loaded data held in container objects. The HTML response includes HTML code for rendering a transactional page, also called a transactional data representation page.

Subsequent ninth and tenth steps 176 and 178, respectively, are similar to the ninth and tenth steps 176, 178 of the process of FIG. 6 and involve the application server sending a response message (based on the HTML generated in step 196) to the web server, and he web server returning a corresponding response to the browser.

Lastly, a data-representing step 198 includes displaying the transactional page to the user via the browser. The transactional page may include transactional data and/or other content or user interface controls for providing user options to perform one or more related actions pertaining to the data.

Figure 8:
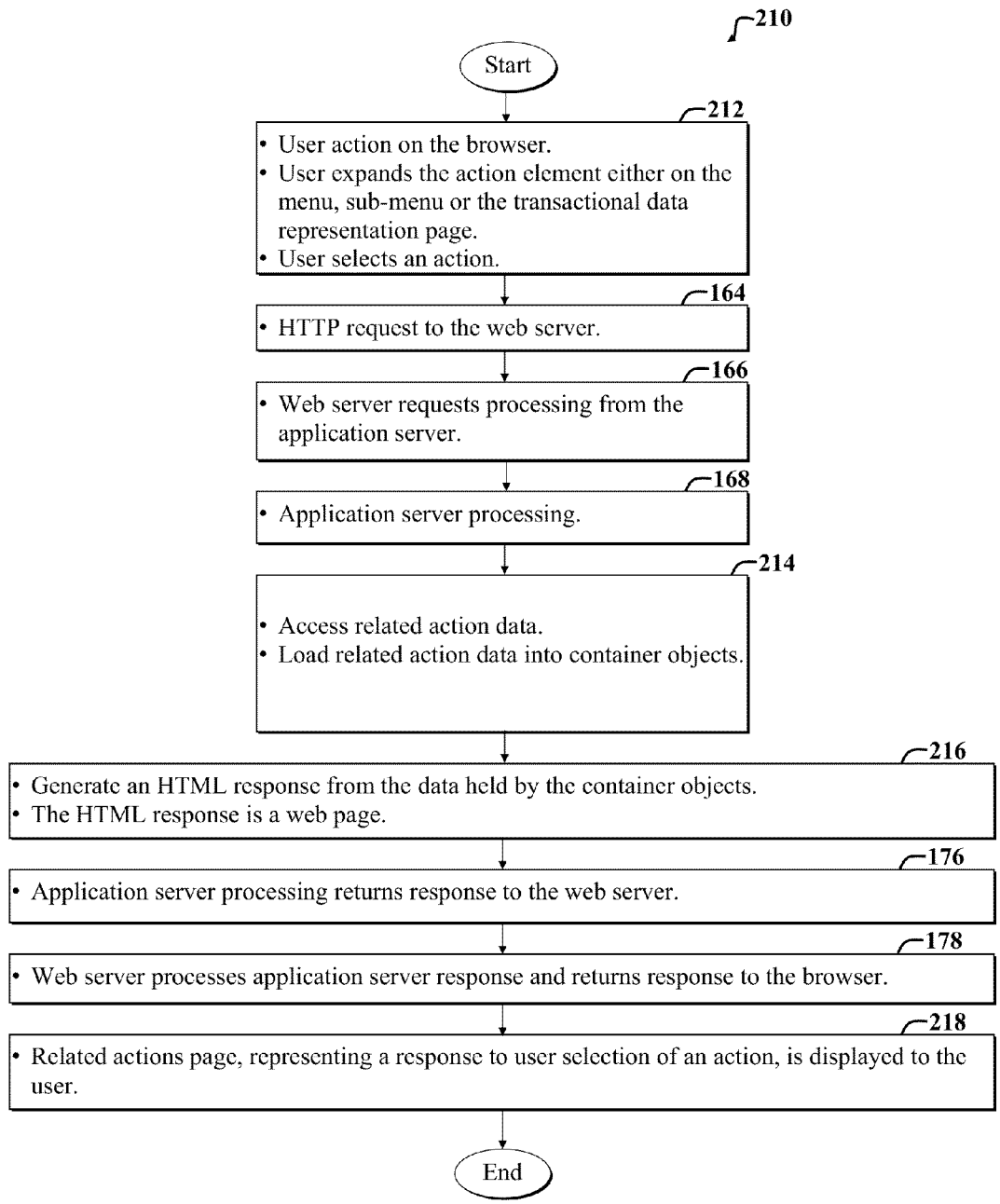
FIG. 8 illustrates a third flow diagram illustrating an example related-content service process adapted for use with the embodiments of FIGS. 1-5.

FIG. 8 illustrates a third flow diagram 210 illustrating an example related-actions service process 210 adapted for use with the embodiments of FIGS. 1-5. The first four steps 212, 164, 166, 168 are similar to the steps 162-168 of FIGS. 6-7 with the exception of the initial step 212. The initial step 212 includes detection of a user action initiated via a browser, where the user action includes the user manipulating a menu to expand a menu item, also called action element, either on a menu, a sub-menu, or a transactional page, and subsequently, detection of user selection of an action from the menu, sub-menu, or transactional page.

After the fourth step 168, whereby application server processing is initiated, a related-content retrieving step 214 is performed. The related-content retrieving step 214 includes retrieving and then assembling data associated with the selected related action into objects, such as software container objects.

A subsequent response-generation step 216 includes generating an HTML response message based on the data held by the container objects. The response message includes HTML code for generating a web page.

Subsequently, steps 176 and 178 are performed, wherein the application server processes and returns the response message to the web server, and the web server processes the response message from the application server and forwards a corresponding response to the browser.

Lastly, a related-content displaying step 218 includes displaying, via the browser, the related action information contained in the response message received by the browser from the application server.

Figure 9:
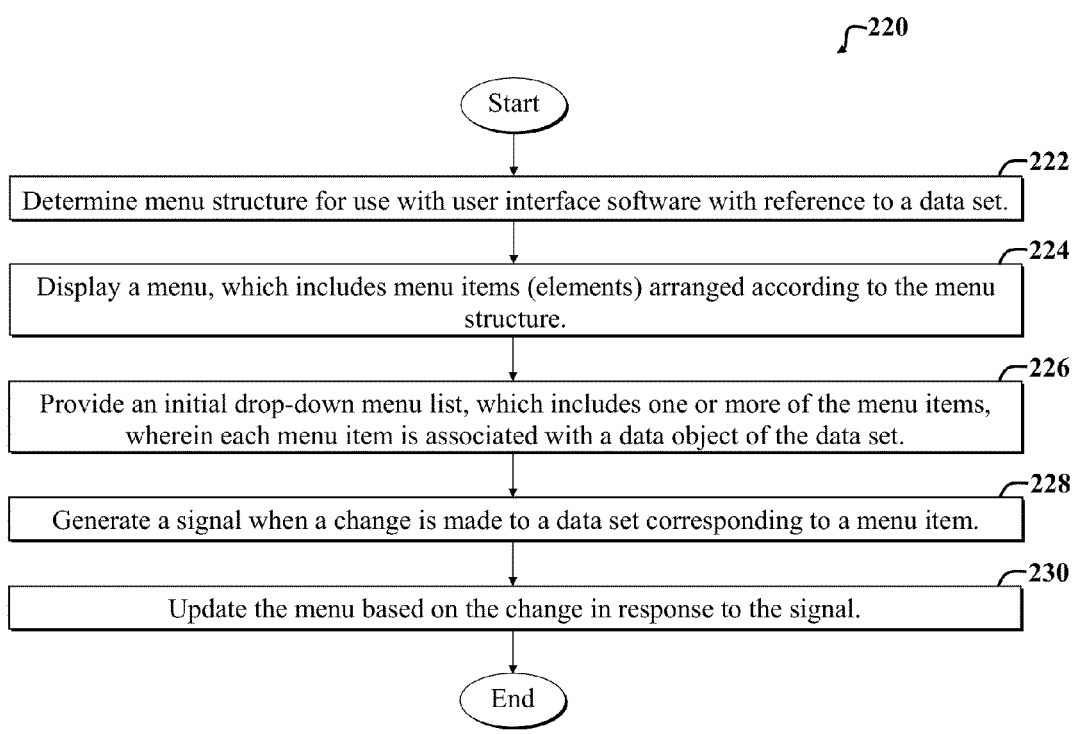
FIG. 9 illustrates a flow diagram of an example method adapted for use with the embodiments of FIGS. 1-5.

FIG. 9 illustrates a flow diagram of an example method 220 adapted for use with the embodiments of FIGS. 1-5.

The method 220 includes an initial menu-structure determining step 222, which involves determining a menu structure for use with user interface software. In certain implementations, the menu structure is predefined by and administrator employing an API, and/or by relationships inherent in the data, and/or by a database structure used to organize the underlying data.

A subsequent displaying step 224 includes displaying a menu, such as via a browser user interface. The menu includes menu items arranged according to the menu structure.

Next, a providing step 226 includes providing an initial drop-down menu list for display via the browser user interface or other user interface software. The initial drop-down menu list includes one or more of the menu items. Each menu item is associated with a data object of the data set.

Subsequently, signal-generating step 228 includes generating a signal when a change is made to a data set corresponding to a menu item. For example, with reference to FIGS. 1 and 9, the menu navigation generator module 20 may monitor the database 16 and accompanying data 18. Changes in the underlying data may trigger a first signal from the database 16 to the menu navigation generator module 20 of FIG. 1. Another signal incorporating HTML for an updated menu may eventually forwarded to the browser 12 based on a change to the underlying data 18.

Lastly, a menu-updating step 230 includes updating the menu based on the change in response to a detected change in the underlying data as indicated by the first signal. The updated menu may be displayed in response to user interaction with the menu, or the menu may automatically be updated in response to a detected change to the underlying data 18.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using implementation specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method, performed by an application server executed by a computer system, for implementing a dynamic menu structure, the method comprising:

accessing, by the application server, a tree structure characterizing a data set in response to a request from a browser application executing on a client computer for information relating to the data set;

generating, by the application server, HTML code of a dynamic menu structure, for display by the browser application, that renders the tree structure;

transferring, by the application server, the HTML code to the browser application;

receiving, by the application server, a signal indicating that a change has been made to the data set in response to a menu action executed by the browser application;

generating, by the application server, updated HTML code, for display by the browser application, of an updated dynamic menu structure that renders an updated tree structure characterizing the change made to the data set; and transferring, by the application server, the updated HTML code to the browser application.

2. The method of claim 1 wherein the browser application is in communication with a web server, and wherein the web server is in communication with the application server.

3. The method of claim 1 wherein the dynamic menu structure is characterized by a hierarchical tree structure, wherein selection of a menu item corresponding to a leaf of the tree structure activates a transactional page corresponding to the leaf in response thereto.

4. The method of claim 1 wherein generating HTML code further comprises:

generating HTML code to provide an option to trigger an action associated with a first menu item, wherein the option is implemented via a second menu item displayed in the dynamic menu structure in proximity to the first menu item.

5. The method of claim 4 wherein the action includes navigation to a third menu item that is related to the first menu item based on a predetermined criterion.

6. The method of claim 5, wherein the predetermined criterion includes a key code associated with data objects corresponding to the first menu item and the third menu item.

7. The method of claim 3 wherein generating HTML code further comprises:

generating HTML code to cause the browser application to display the dynamic menu structure in a graphical format, wherein the graphical format depicts the hierarchical tree structure or portion thereof.

8. The method of claim 7 wherein generating HTML code further comprises:

generating HTML code to cause the browser application to display a drop-down menu or link in association with a leaf of the hierarchical tree structure, wherein the drop-down menu or link provides one or more user interface controls for performing an action associated with data represented by the leaf.

9. The method of claim 8, wherein a drop-down menu or link displayed in association with a leaf of the hierarchical tree structure is represented in the dynamic menu structure as a menu item.

10. The method of claim 1 wherein generating HTML code further comprises:

generating HTML code to cause the browser application to activate a fly-out menu list upon user selection of a menu item that is associated with one or more subordinate menu items.

11. The method of claim 10 wherein generating HTML code further comprises:

generating HTML code to cause the browser application to display an indication of a position in the dynamic menu structure corresponding to a location in the dynamic menu structure navigated to by a user.

12. The method of claim 11, wherein generating HTML code further comprises:

generating HTML code to cause the browser application to display a breadcrumb band above one or more displayed menu lists or menu fly-out lists.

13. The method of claim 12 wherein the breadcrumb band is adapted to selectively scroll to accommodate tracking of a user position in the dynamic menu structure.

14. The method of claim 13, further including displaying one or more navigation loops in the breadcrumb band.

15. The method of claim 13, wherein the breadcrumbs represent selectable menu items.

16. The method of claim 1 wherein generating HTML code further comprises:

generating HTML code to determine an initial drop-down menu with reference to one or more data permissions associated with a current user of the dynamic menu structure.

17. The method of claim 1, wherein generating HTML code further comprises:

generating HTML code to limit displayed menu items to only menu items associated with data objects to which a user has predetermined permissions to view.

18. An apparatus comprising:

one or more processors; and logic encoded in one or more non-transitory computer readable media for execution by the one or more processors and when executed performing the steps of:

accessing a tree structure characterizing a data set in response to a request from a browser application executing on a client computer for information relating to the data set;

generating HTML code of a dynamic menu structure, for display by the browser application, that renders the tree structure;

transferring the HTML code to the browser application;

receiving a signal indicating that a change has been made to the data set in response to a menu action executed by the browser application;

generating updated HTML code, for display by the browser application, of an updated dynamic menu structure that renders an updated tree structure characterizing the change made to the data set; and transferring the updated HTML code to the browser application.

19. A non-transitory processor-readable storage device including instructions executable by a digital processor, the non-transitory processor-readable storage device including one or more instructions for, when executed by a computer, performing the steps of:

accessing a tree structure characterizing a data set in response to a request from a browser application executing on a client computer for information relating to the data set;

generating HTML code of a dynamic menu structure, for display by the browser application, that renders the tree structure;

transferring the HTML code to the browser application;

receiving a signal indicating that a change has been made to the data set in response to a menu action executed by the browser application;

generating updated HTML code, for display by the browser application, of an updated dynamic menu structure that renders an updated tree structure characterizing the change made to the data set; and transferring the updated HTML code to the browser application.

20. The non-transitory processor-readable storage device of claim 19 wherein the browser application is in communication with a web server, and wherein the web server is in communication with an application server that accesses the tree structure.

21. The non-transitory processor-readable storage device of claim 19 wherein the dynamic menu structure is characterized by a hierarchical tree structure, wherein selection of a menu item corresponding to a leaf of the tree structure activates a transactional page corresponding to the leaf in response thereto.

22. The non-transitory processor-readable storage device of claim 19 wherein generating HTML code further comprises:
   generating HTML code to provide an option to trigger an action associated with a first menu item, wherein the option is implemented via a second menu item displayed in the dynamic menu structure in proximity to the first menu item.

23. The non-transitory processor-readable storage device of claim 22 wherein the action includes navigation to a third menu item that is related to the first menu item based on a predetermined criterion.

24. The non-transitory processor-readable storage device of claim 23 wherein the predetermined criterion includes a key code associated with data objects corresponding to the first menu item and the third menu item.

25. The non-transitory processor-readable storage device of claim 21 wherein generating HTML code further comprises:
   generating HTML code to cause the browser application to display the dynamic menu structure in a graphical format, wherein the graphical formal depicts the hierarchical tree structure or portion thereof.

26. The non-transitory processor-readable storage device of claim 25 wherein generating HTML code further comprises:
   generating HTML code to cause the browser application to display a drop-down menu or link in association with a leaf of the hierarchical tree structure, wherein the drop-down menu or link provides one or more user interface controls for performing an action associated with data represented by the leaf.

27. The non-transitory processor-readable storage device of claim 26 wherein a drop-down menu or link displayed in association with a leaf of the hierarchical tree structure is represented in the dynamic menu structure as a menu item.

28. The non-transitory processor-readable storage device of claim 19 wherein generating HTML code further comprises:
   generating HTML code to cause the browser application to activate a fly-out menu list upon user selection of a menu item that is associated with one or more subordinate menu items.

29. The non-transitory processor-readable storage device of claim 28 wherein generating HTML code further comprises:
   generating HTML code to cause the browser application to display an indication of a position in the dynamic menu structure corresponding to a location in the dynamic menu structure navigated to by a user.

30. The non-transitory processor-readable storage device of claim 29 wherein generating HTML code further comprises:
   generating HTML code to cause the browser application to display a breadcrumb band above one or more displayed menu lists or menu fly-out lists.

* * * * *

UNITED STATES PATENT AND TRADEMARK OFFICE
CERTIFICATE OF CORRECTION

PATENT NO. : 9,081,580 B2
APPLICATION NO. : 13/077673
DATED : July 14, 2015
INVENTOR(S) : Gaffney et al.

Page 1 of 1

It is certified that error appears in the above-identified patent and that said Letters Patent is hereby corrected as shown below:

In the Specification

In column 3, line 53, delete "and or" and insert -- and/or --, therefor.

In column 10, line 18, delete "ahs" and insert -- has --, therefor.

In the Claims

In column 17, line 32, in Claim 25, delete "formal" and insert -- format --, therefor.

Signed and Sealed this
Ninth Day of August, 2016

Michelle K. Lee
*Director of the United States Patent and Trademark Office*